UNITED STATES PATENT OFFICE.

ALBERT KOCH, OF SCHÖNBERG, GERMANY.

INCANDESCENT MANTLE.

SPECIFICATION forming part of Letters Patent No. 662,170, dated November 20, 1900.

Application filed June 28, 1900. Serial No. 21,985. (No model.)

*To all whom it may concern:*

Be it known that I, ALBERT KOCH, a subject of the King of Würtemburg, residing in Schönberg, near Berlin, in the Kingdom of Prussia and Empire of Germany, have invented certain new and useful Improvements in Incandescent Mantles, of which the following is a specification.

This invention relates to incandescent mantles used in gas-lighting. It is well known that incandescent mantles impregnated with thoric and serous oxids alone are of very little strength and durability. It is common, therefore, to add alumina, beryllia, silica, and the like to increase their strength and durability. These additions, however, while increasing the structural strength of the oxid skeleton reduce the illuminating power of the mantle.

The object of this invention is to provide a mantle which is possessed of great structural strength and durability as compared with the mantles at present in use and which has also an increased and more permanent illuminating power.

The invention consists, first, in the process herein described of making incandescent mantles, which comprises the steps of mixing hydrofluoric acid with an aqueous solution of a thoric salt and a ceric salt, then impregnating a suitable fabric blank with this mixture and drying and incinerating the same.

The invention consists, secondly, of an incandescent mantle composed of a suitable fabric blank impregnated with thoric oxid and ceric oxid.

The underlying principle of my invention is the use in the impregnation of the mantle-blanks of a mixture of hydrofluoric acid with a solution of thoric and ceric (instead of serous) compounds.

In practically carrying out the invention hydrofluoric acid is added to the concentrated aqueous solution of a thoric salt. The mixture is then heated for a short time, and to it is then added an aqueous solution of a ceric compound. Ceric oxalate is a suitable compound for this purpose. This salt is, however, insoluble in pure water, and in order to dissolve it it is necessary to add a small quantity of an organic substance—such, for instance, as pyrocatechin—or the thoric salt and ceric salt may be first both dissolved in water (if necessary, adding to this solution also an organic substance, such as pyrocatechin, to secure the dissolving of the ceric salt) and then the hydrofluoric acid added. In this case no heating is necessary.

The proportions of the different compounds may be varied considerably; but as a rule it is preferable to use the following proportions, which yield excellent results:

Example 1. Dissolve 59.4 grams of thoric nitrate in one hundred grams water, add one gram commercial hydrofluoric acid, heat the mixture for about three minutes up to 50° centigrade, and then add 2.5 grams ceric oxalate and three grams pyrocatechin dissolved in thirty-five grams water.

Example 2. Dissolve 59.4 grams thoric nitrate, 2.5 grams ceric oxalate, and three grams pyrocatechin in one hundred and thirty-five grams water, and to this solution add one gram commercial hydrofluoric acid.

The fabric or tissue mantle-blanks are then impregnated with either of the solutions, about four grams of solution being used for each blank. The impregnated blanks are then dried and incinerated in the usual manner, a mantle composed of thoric oxid and ceric (instead of serous) oxid being thus formed.

Hydrofluoric acid renders the oxid skeleton very strong and elastic, while the use of ceric compounds instead of serous compounds, as heretofore used, remarkably increases the illuminating power. Moreover, very strong tissues or fabrics, such as cotton yarn Nos. 50 and 60, may be used without causing deterioration of the illuminating power, thereby increasing the strength and durability of the mantles.

The influence of the ceric compounds is a new and particular one, resulting from the different proportions of thorium and cerium as compared with the proportions of those elements in the mantles heretofore used. In the new mantles the percentage of cerium is much larger, whereby the illuminating power is rendered very durable.

Photometric tests have shown that under the usual pressure and consumption of gas the new mantles have an illuminating power of one hundred and five Hefner candles increasing, as a rule, up to one hundred and fifteen.

After eight hundred hours' incandescence the mantle is still in excellent condition in respect to illuminating power, form, and structural strength.

It may also be mentioned that incinerated incandescent mantles may also be treated with hydrofluoric acid and ceric salts by immersing the same in solutions of these compounds; but it is preferable to impregnate the fabric blanks with the aqueous solutions, as above described.

Having thus described my invention, I claim as new and desire to secure by Letters Patent—

1. The herein-described process of making incandescent mantles which consists in mixing hydrofluoric acid with an aqueous solution of a thoric salt and a ceric salt, then impregnating a suitable fabric blank with this mixture, and drying and incinerating the same, substantially as set forth.

2. An incandescent mantle composed of a suitable fabric blank impregnated with thoric oxid and ceric oxid, substantially as set forth.

In testimony that I claim the foregoing as my invention I have signed my name in presence of two subscribing witnesses.

ALBERT KOCH.

Witnesses:
WOLDEMAR HAUPT,
HENRY HASPER.